United States Patent [19]

Fukao

[11] Patent Number: 5,474,724
[45] Date of Patent: Dec. 12, 1995

[54] METHOD FOR MOLDING A CERAMIC PORT LINER

[75] Inventor: Kaname Fukao, Inuyama, Japan

[73] Assignee: NGK Insulators, Ltd., Nagoya, Japan

[21] Appl. No.: 251,671

[22] Filed: May 31, 1994

Related U.S. Application Data

[63] Continuation of Ser. No. 952,999, Sep. 29, 1992, abandoned.

[30] Foreign Application Priority Data

Oct. 4, 1991 [JP] Japan .................................. 3-257789
Mar. 27, 1992 [JP] Japan .................................. 4-070772

[51] Int. Cl.[6] ..................................................... B28B 1/26
[52] U.S. Cl. ..................................... 264/86; 264/87
[58] Field of Search ............................... 264/86, 87

[56] References Cited

U.S. PATENT DOCUMENTS

| | | | |
|---|---|---|---|
| 4,018,857 | 4/1977 | Schubart . | |
| 4,209,474 | 6/1980 | Prochazka | 264/65 |
| 4,528,152 | 7/1985 | Aoyama | 264/87 |
| 4,799,601 | 1/1989 | Shimai | 264/1.2 |
| 4,882,111 | 11/1989 | Murata | 264/87 |
| 5,013,500 | 5/1991 | Hamanaka | 264/86 |
| 5,013,501 | 5/1991 | Fukao | 264/86 |

FOREIGN PATENT DOCUMENTS

| | | |
|---|---|---|
| 0306865 | 9/1988 | European Pat. Off. . |
| 0285312 | 10/1988 | European Pat. Off. . |
| 0874724 | 4/1953 | Germany . |
| 3741002 | 7/1988 | Germany . |
| 58-222808 | 12/1983 | Japan . |
| 62-042805 | 2/1987 | Japan . |
| 63-062703 | 3/1988 | Japan . |
| 63-197623 | 8/1988 | Japan . |
| 63-288705 | 11/1988 | Japan . |
| 1-215503 | 8/1989 | Japan . |
| 1270557 | 10/1989 | Japan . |
| 3254904 | 11/1991 | Japan . |
| 3-77045 | 12/1991 | Japan . |
| 1130481 | 2/1964 | U.S.S.R. . |
| 0172669 | 8/1965 | U.S.S.R. . |
| 0808475 | 2/1981 | U.S.S.R. . |
| 1295056 | 11/1972 | United Kingdom . |
| 1295055 | 11/1972 | United Kingdom . |

OTHER PUBLICATIONS

Nürnberger, "Entwicklun und Einführung des Schlicker–DruckgieBverfahrens in der Sanitärkeramik," 1988, pp. 227–232, Keramische Zeitschrift–40.Jahrgang.Nr.4.

"Pressure Casting System Dorst/Laufen now also for battery pressure casting," Jun. 1990, p. 280, cfi/Ber. DKG 67 (1990) No. 6.

Klein, "Medium–pressure casting and the mold material Sanidur," Jun. 1990, pp. 260–263, cfi/Ber. DKG 67 (1990) No. 6.

Bordia et al., "Sintering of $TiO_2$–$Al_2O_3$ Composites: A Model Experimental Investigation," 1988, pp. 302–310, J. Am. Ceram. Soc., 71[4].

Blanchard, E. G., "Pressure Slip Casting," *Ceramic Engineering and Science Proceedings*, 11[11–12] (Nov.–Dec. 1990), pp. 1797–1803.

Kaptsevich et al., "Porous Metal Molds for Plastic Forming of Ceramic Parts," *Glass and Ceramics*, vol. 41, No. 5/6, (May–Jun. 1984).

*Primary Examiner*—James Derrington
*Attorney, Agent, or Firm*—Ronald J. Kubovcik

[57] ABSTRACT

This method is to mold a ceramic port liner from a ceramic material by drain casting. The slurry of the ceramic material is subjected to a pressure of 5 kgf/cm$^2$ or higher in a mold. The method is also to mold under the condition that the mold is transformed by reducing a certain volume within the range of 0.3%– 1.0% in the direction of constriction applied. According to this method, a ceramic port liner without deformation and unevenness in thickness can be obtained.

6 Claims, 1 Drawing Sheet

METHOD FOR MOLDING A CERAMIC PORT LINER

This application is a continuation of application Ser. No. 07/952,999 filed Sep. 29, 1992 (now abandoned).

BACKGROUND OF THE INVENTION AND RELATED ART STATEMENT

The present invention relates to a method for molding a ceramic port liner used to line an exhaust port such as a head port and manifold in a gasoline engine or a diesel engine.

In recent years, environmental pollution by automobile exhaust gas has become a serious social problem. Although a measure to eliminate the harmful materials contained in the gas using a catalyst is commonly used, it is desired to reduce the use of noble metals such as Pt and Rh, which are used as a catalyst, from the view point of resource and cost. Moreover, four-valve engines increasing in recent years have the problem of deterioration in a purifying property by a catalyst caused by dropping of the exhaust gas temperature. To solve such problems, it is proposed to raise the exhaust gas temperature by adiabatic function of a ceramic port liner with which the exhaust port of the engine is lined. A ceramic port liner in the present invention is produced by drain casting generally with a gypsum mold or the like. FIGS. 1 and 2 shows a port liner in a forked shape comprising two ports, Port 3a and Port 3b, and an exhaust exit 4 and having two exhaust galleys 2 therein. This type of ceramic port liner has a tendency to be thin at the point of bifurcation 5, where a damage may be often caused.

Pressurized casting has been conventionally known as slip casting and has been adopted mainly for use in solid slip casting. However, it has rarely been applied to drain casting, especially to a fork shaped ceramic port liner. Therefore, matters such as the proper pressure upon molding a ceramic port liner have scarcely been investigated.

SUMMARY OF THE INVENTION

An object of the present invention is to provide a ceramic port liner without risk of damage during casting or during the use, by applying pressurized slip casting to drain casting and adjusting the pressure properly.

According to the present invention, there is provided a method to mold a ceramic port liner from a ceramic material by drain casting, characterized in subjecting the slurry comprising the ceramic to the pressure of 5 kgf/cm$^2$ or higher in the mold.

In the present invention, it is preferable that the pore size of the mold is 5–75 times larger than the average diameter of ceramic powders to be molded in order to prevent the slurry from passing through the mold.

According to the present invention, there is also provided a method to mold a ceramic port liner from a ceramic material by drain casting, characterized in that the molding is performed under the condition that the mold is transformed by reducing a certain volume within the range of 0.3%–1.0% in the direction of constriction applied.

DETAILED DESCRIPTION OF THE INVENTION

Figure 1:
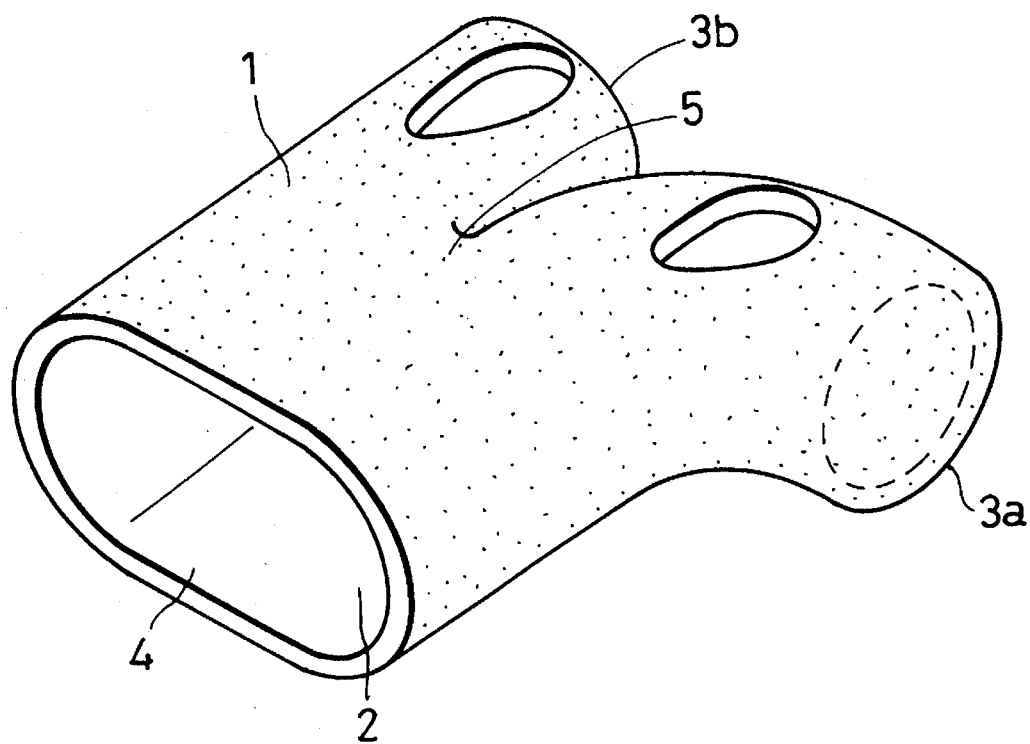
FIG. 1 shows a perspective view showing an example of a ceramic port liner.
Figure 2:
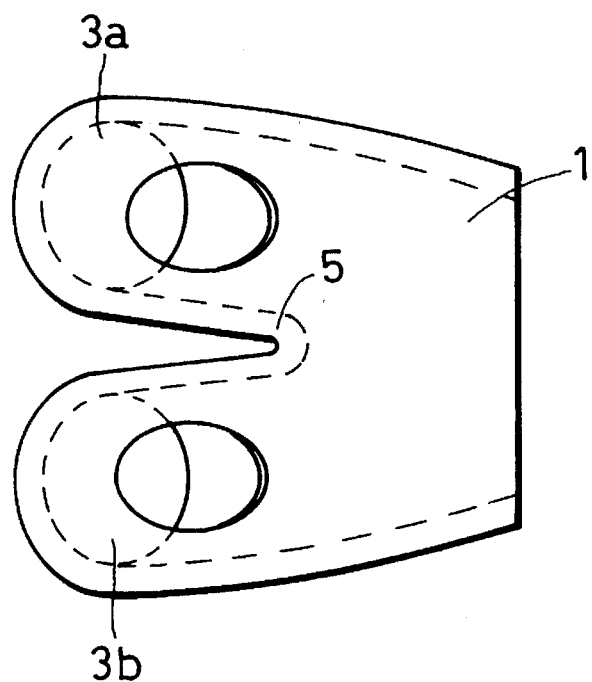
FIG. 2 shows a view from the top showing an example of a ceramic port liner.

The method for molding a ceramic port liner in the present invention is that the pressure during the operation of drain casting is specified.

To be concrete, drain casting is adopted to the present invention, and the slurry to be molded is subjected to the pressure of 5 kgf/cm$^2$ or higher, preferably 10 kgf/cm$^2$ or higher. When the pressure is lower than 5 kgf/cm$^2$, a molded body is deformed with a thin bifurcation where a crack is likely to be caused when combining the molded body inside the metal to be lined during a metal-ceramic insertion process.

In the present invention, it is also preferable that the molding is performed under the condition that the mold is transformed by reducing a certain volume within the range of 0.3%–1.0%. When the degree of the volume to be reduced is less than 0.3%, continuity of the mold deteriorates in the portion where the parts of the mold are connected, which results in cracks when the obtained port liner is combined with the inside of a metal (metal-ceramic insertion). When the degree of the volume to be reduced is over 1.0%, the whole mold is over-transformed, which sometimes leads to damaging.

The outside of the mold is preferably a vacuum, and also preferably, the edge portion forming parting lines of the mold is not dull.

It is also preferable in the present invention that the slurry to be adopted contains water in a proportion of 13–30% by weight and has a viscosity of 0.5–10 poise.

For the mold, a porous resin or a porous ceramic mold is ideal. A mold having an average pore size of almost as large as the average diameter of ceramic powders to be molded has been adopted because the mold needs to have a function to filter only the medium in the slurry which is a mixture of ceramic powder and water.

However, it has been indicated as a problem that such a mold for which only its filtering property is considered causes unevenness in the thickness of the molded body when the water permeability of the mold is partially uneven.

The present invention solved this problem by specifying the average pore size on the molding surface of the mold to be 5–75 times, preferably 10–50 times larger than the average diameter of ceramic powder particles.

In other words, it is found out that when an average pore size on the molding surface of the mold is specified to be 5–75 times, preferably 10–50 times larger than the average diameter of ceramic powder particles, the pores of the mold are stuffed with ceramic powder in the early stages of molding to make the pore size substantially small. Moreover, as they are stuffed only on the very surface of the molding surface of the mold, the high water permeability before stuffing is still maintained after stuffing. Furthermore, the step in which a medium such as water passes through the layer of a ceramic precipitation is rate-determining, which does not cause unevenness of thickness even if the mold has unevenness in its water permeability.

When the average pore size of the molding surface of the mold is smaller than five times of the average diameter of ceramic powder particles, the above-mentioned problem is not sufficiently solved. When the average pore size of the molding surface of the mold is larger than 75 times of the average diameter of ceramic powder particles, the slurry is likely to pass though the mold when it is pressurized because the pores are not stuffed.

In for the pores of the mold to be stuffed in the early stages of molding, it is preferable that the pressure on slurry is controlled to be 2 kgf/cm² or lower until precipitation of ceramic powder is completed.

The average pore size of this kind of mold can be adjusted more effectively by applying a filler only on the molding surface of the mold. A filler which consists of a pigment (solid powder) and a color expanding material (a film forming material) like paint or either of them can be adopted. The solid powder is selected out of synthetic fiber, carbon, ceramics, metals, or the like. A film forming material is selected from synthetic fiber, polymers containing metal oxide, or the like. Both selections depend upon the mold and the material to be molded.

As the material to be molded, a ceramic material containing aluminum titanate, mullite, or the like as its main ingredient can be adopted, though a ceramic material containing aluminum titanate is preferable. It is more preferable that the material contains aluminum titanate in the proportion of 65% or higher by weight as a crystal phase, the average particle diameter of the crystal is 10 µm or larger, the Young's modulus ranging between 50 and 2000 kgf/mm², the bending strength ranging between 0.5 and 5.0 kgf/mm², and the porosity ranging between 5 and 35%.

EXAMPLE

The present invention is described more in detail with reference to an example. However, it is not limited to the example.

(Example 1)

To a material of aluminum titanate having a composition of $Al_2O_3$ 49.0%, $TiO_2$ 45.5%, $Fe_2O_3$ 1.5%, $SiO_2$ 4.0% by weight and having an average diameter of particles varied as shown in Table 1 added a peptizing agent of polycarbonate oxide in the proportion of 0.5% by weight and water in the proportion of 14% by weight. Then, a binder of an acrylic acid resin is added in the proportion of 4.5% by weight to obtain the slurry with its viscosity of 3 poise. The slurry was injected into the mold of a porous resin by a pressure shown in Table 1 and drained after precipitated for a certain period of time. The various kinds of test pieces in a forked shape obtained by this 'drain casting' were desicated and then sintered to obtain ceramic port liner test pieces (No. 1–8). Concerning Test No. 1, the time of casting was 12% longer than that of Test No. 2.

The test pieces had a bending strength of 3.5 kgf/mm², a Young's modulus of 2000 kgf/mm², and a porosity of 15%.

The test pieces were evaluated regarding the degree of prevention for the particles from passing through the mold, the degree of deformation caused by the thinness at the point of bifurcation, and unevenness of the thickness.

The average diameter of powders used as a material was measured by a laser diffraction method (CILAS 850 of CILAS ALCATAL SA. was used.), and the average pore size of the mold was measured by a method of charging mercury by pressure (Porosimeter Model 2000 of Carloerba Company was used.).

By investigating the penetration of the slurry into a drainage pipe for filtered water, the evaluation was given with 'o' for the solid less than 1% contained in the filtered water as excellent 'Δ' for 1% or more and less than 3% as fair enough to stand practical use, and 'X' for 3% or more failure.

For the unevenness of thickness, the evaluation was given depending on the difference of thickness at the point of bifurcation and at the thickest portion with 'o' for the difference less than 0.5 mm as excellent, 'Δ' for 0.5 mm or more and less than 1 mm as fair enough to stand practical use, and 'X' for 1 mm or more as failure.

TABLE 1

| Test No. | 1 | 2 | 3 | 4 | 5 | 6 | 7 | 8 |
|---|---|---|---|---|---|---|---|---|
| Average diameter of ceramic powders (µm): A | 0.40 | 0.40 | | 0.40 | | 0.73 | 0.40 | 0.40 |
| Average pore size of the mold (µm): B | 1 | 2 | | 20 | | 7 | 30 | 40 |
| B/A | 2.5 | 5 | | 50 | | 10 | 75 | 100 |
| Pressure (kgf/cm²) | 15 | 15 | 3 | 5 | 10 | 30 | 20 | 15 |
| Evaluation | | | | | | | | |
| Thinning of bifurcation point | O | O | X | Δ | O | O | O | — |
| Unevenness of thickness | X | Δ | — | O | O | O | O | — |
| Degree of Deformation | X | O | X | X | O | O | O | — |
| Degree of Powders in filtrate | O | O | O | O | O | O | Δ | Δ |

As evident from the results shown in Table 1, the pieces which scarcely have deformation or unevenness in the thickness are obtained from the slurry subjected to a pressure of 5 kgf/cm², while the piece obtained from the slurry subjected to a pressure of 3 kgf/cm² was not molded enough to be evaluated. The particles scarcely passed through the mold when the average pore size(B) of the mold was 5–75 times larger than the average diameter(A) of ceramic powders, while the obtained body was uneven and was thin particularly at the point of bifurcation when B/A was 2.5. When B/A was 100, the molded body was not molded enough to be evaluated as the particles passed through the mold.

(Example 2)

To a material of aluminum titanate having a composition of $Al_2O_3$ 49.0%, $TiO_2$ 45.5%, $Fe_2O_3$ 1.5%, $SiO_2$ 4.0% by weight added a peptizing agent of polycarbonate oxide in the proportion of 0.5% by weight and water in the proportion of 14% by weight. Then, a binder of an acrylic acid resin is added in the proportion of 4.5% by weight to obtain the slurry with its viscosity of 3 poise. The slurry was injected into the mold of a porous resin by a pressure and drained after precipitated for a certain period of time. The various kinds of test pieces in a forked shape which vary in thickness obtained by varying the degree of volume reduction of the mold and by varying the period of time for molding as shown in Table 2 were desicated and then sintered to obtain ceramic port liner test pieces (No. 1–7). The pressure given to the slurry was 20 kgf/cm².

The test pieces had a bending strength of 3.5 kgf/mm², a Young's modulus of 2000 kgf/mm², and a porosity of 15%.

The test pieces were combined inside the aluminum alloy having a thickness of 7 mm (metal-ceramic insertion) and evaluated the properties as an insert and its adiabatic property.

The adiabatic property was evaluated by measuring the temperature of the inner surface of aluminum at the point of bifurcation when exhaust propane gas at a temperature of 700° C. was sent through the galleys in the test pieces. The evaluation was given with 'o' for the measured temperature of 350° C. or lower as fair 'X' for the temperature over 350° C.

The results are shown in Table 2.

TABLE 2

| Test Piece No. | 1 | 2 | 3 | 4 | 5 | 6 | 7 |
|---|---|---|---|---|---|---|---|
| Reduced Volume by Constriction (%) | 0.4 | 0.1 | 0.3 | 0.8 | 1.0 | 1.2 | 0.5 |
| Period of time for Molding (second) | 57 | 65 | 65 | 65 | 65 | 65 | 147 |
| Maximum Thickness (mm) | 2.8 | 3 | 3 | 3 | 3 | 3 | 4.5 |
| Minimum Thickness (mm) | 2.0 | 1.5 | 2.0 | 2.5 | 2.7 | 2.7 | 3.5 |
| Maximum Thickness/Minimum Thickness | 1.4 | 2 | 1.5 | 1.2 | 1.1 | 1.1 | 1.3 |
| Occurance of Crack during Metal-Ceramic insertion | absent | present | absent | absent | absent | absent | absent |
| Over-transformation (damage) | absent | absent | absent | absent | absent | present | absent |
| Adiabatic Effect | O | O | O | O | O | O | O |
| Total Evaluation | O | X | O | O | O | X | O |

As evident from the results shown in Table 2, when the reduced volume of the mold by constriction is less than 0.3%, the thinnest part of the obtained ceramic port liner is thinner than the given thinness, and the ratio of the maximum thickness to the minimum thickness (maximum thickness/minimum thickness) of each port liner is large in number above 1.5. On the contrary, when the reduced volume of the mold by constriction surpasses 1.0%, deformation of the mold is caused.

When the thinnest part of the obtained ceramic port liner is thinner than 2 mm, crack formation is observed due to the metal-ceramic insertion and the adiabatic property fails. On the contrary, when the thickest part of the obtained ceramic port liner is thicker than 4.5 mm, the time spent on molding is too long, which is uneconomical. It was also found preferable that the ratio of the maximum thickness to the minimum thickness (maximum thickness/minimum thickness) of each port liner is 1.5 or lower.

(Example 3)

A test piece of 3 mm thick ceramic port liner was obtained in the same manner as in Example 2 except that mullite was used as a ceramic material. From the measurement of its adiabatic property in the same manner as in Example 2, it was confirmed of having adiabatic effect to the same degree as in the ceramic port liner obtained in Example 2.

The test piece had a bending strength of 8 kgf/mm$^2$, a Young's modulus of 9500 kgf/mm$^2$, and a porosity of 10%.

What is claimed is:

1. A method of molding a ceramic port liner comprising:
   preparing a slurry of ceramic powder in water;
   introducing said slurry into a two-part porous mold under a pressure of 2 kgf/cm$_2$ or lower until the ceramic powder precipitates and fills the pores at an inner surface of the mold; and
   pressuring said slurry under a pressure of 5 kgf/cm$^2$ or higher after precipitation of the ceramic powder to fill the pores at the inner surface of the mold is completed and while draining the slurry from said mold to form said slurry into a shape of a desired configuration;
   wherein the average pore size of the pores of said mold is 5–75 times larger than the average diameter of the ceramic powder.

2. A method of molding a ceramic port liner as described in claim 1, wherein said slurry is pressurized under a pressure of 10 kgf/cm$^2$ or higher after precipitation of ceramic powder is completed.

3. A method of forming a ceramic port liner as described in claim 1, wherein the average pore size of the pores of said mold is 10–50 times larger than the average diameter of the ceramic powder to be molded.

4. A method of molding a ceramic port liner as described in claim 1,
   wherein said slurry is introduced into the mold while the volume of the mold is reduced 0.3%–1.0%.

5. A method of molding a ceramic port liner as described in claim 1, wherein said ceramic material is aluminum titanate.

6. A method of molding a ceramic port liner as described in claim 4, wherein said ceramic material is aluminum titanate.

* * * * *